United States Patent
Waring

(10) Patent No.: US 8,400,113 B2
(45) Date of Patent: Mar. 19, 2013

(54) BATTERY ENHANCED, SMART GRID ADD-ON FOR APPLIANCE

(76) Inventor: Mark Andrew Waring, Saratoga, CA (US)

( * ) Notice: Subject to any disclaimer, the term of this patent is extended or adjusted under 35 U.S.C. 154(b) by 281 days.

(21) Appl. No.: 13/025,213

(22) Filed: Feb. 11, 2011

(65) Prior Publication Data

US 2012/0206108 A1 Aug. 16, 2012

(51) Int. Cl.
*H02J 7/00* (2006.01)
*G05D 3/12* (2006.01)
(52) U.S. Cl. .......... 320/137; 700/295
(58) Field of Classification Search .......... 320/137
See application file for complete search history.

(56) References Cited

U.S. PATENT DOCUMENTS

| | | | |
|---|---|---|---|
| 6,548,986 B1 | 4/2003 | Jakubowski | |
| 7,209,048 B1 | 4/2007 | Pace | |
| 7,408,272 B2 | 8/2008 | Marquet | |
| 7,547,990 B2 | 6/2009 | Varzhabedian | |
| 7,663,267 B2 | 2/2010 | Yun | |
| 7,700,228 B2 | 4/2010 | Takeshita | |
| 7,825,615 B2 | 11/2010 | Chen | |
| 8,138,690 B2 * | 3/2012 | Chemel et al. | 315/318 |
| 2009/0055267 A1* | 2/2009 | Roker | 705/14 |
| 2009/0094173 A1 | 4/2009 | Smith | |
| 2010/0017045 A1 | 1/2010 | Nesler et al. | |
| 2010/0270933 A1* | 10/2010 | Chemel et al. | 315/130 |
| 2010/0312411 A1 | 12/2010 | Brooke | |

FOREIGN PATENT DOCUMENTS

JP 2004-236460 8/2004

OTHER PUBLICATIONS

General Electric's Home Energy Management System Website, http://www.geappliances.com/home-energy-manager/.
LG's Smart Appliance Press Release, Jan. 2011, http://www.lgnewsroom.com/newsroom/contents_main.php?category=6&product_code=4&product_type=4&post_index=741.
Whirlpool Corporation's Smart Appliance Article, May 2010 http://www.electronichouse.com/article/whirlpool_aims_for_smart_appliances_in_2011/.
Example of localized battery back up solutions, often known as "UPS" (Uninterruptable Power Supply), http://www.homebackup-power.co.za/.
Example of Residential Energy Storage (RES) concept http://www.pikeresearch.com/research/residential-energy-storage.

\* cited by examiner

*Primary Examiner* — M'Baye Diao
(74) *Attorney, Agent, or Firm* — Tran & Associates

(57) ABSTRACT

Systems and methods are disclosed for satisfying a demand response (DR) signal includes receiving the DR signal from an external source through a communication module; connecting an energy storage source to an appliance; charging the energy storage source during a first DR period specified by the external source; and disconnecting line power and using power from the energy storage source during a second DR period.

20 Claims, 20 Drawing Sheets

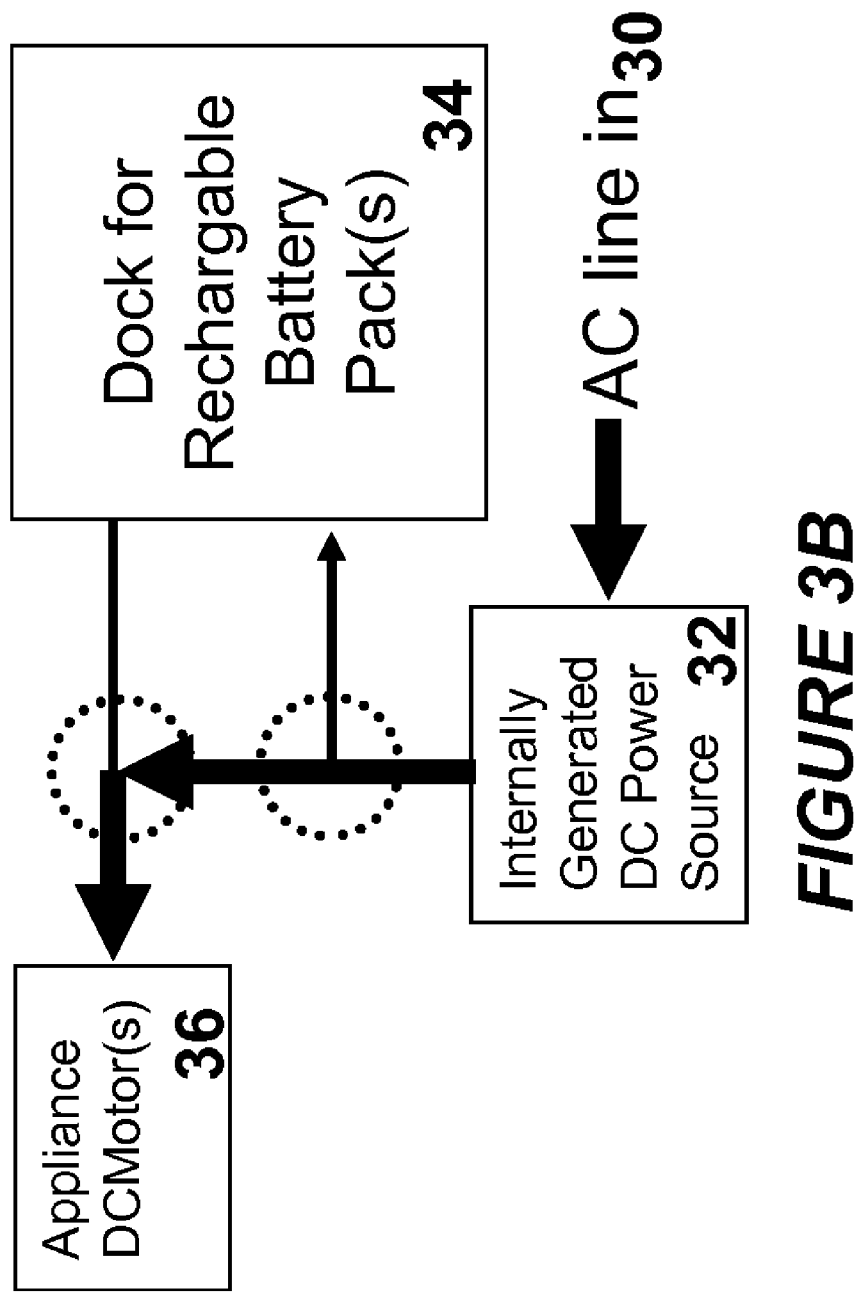

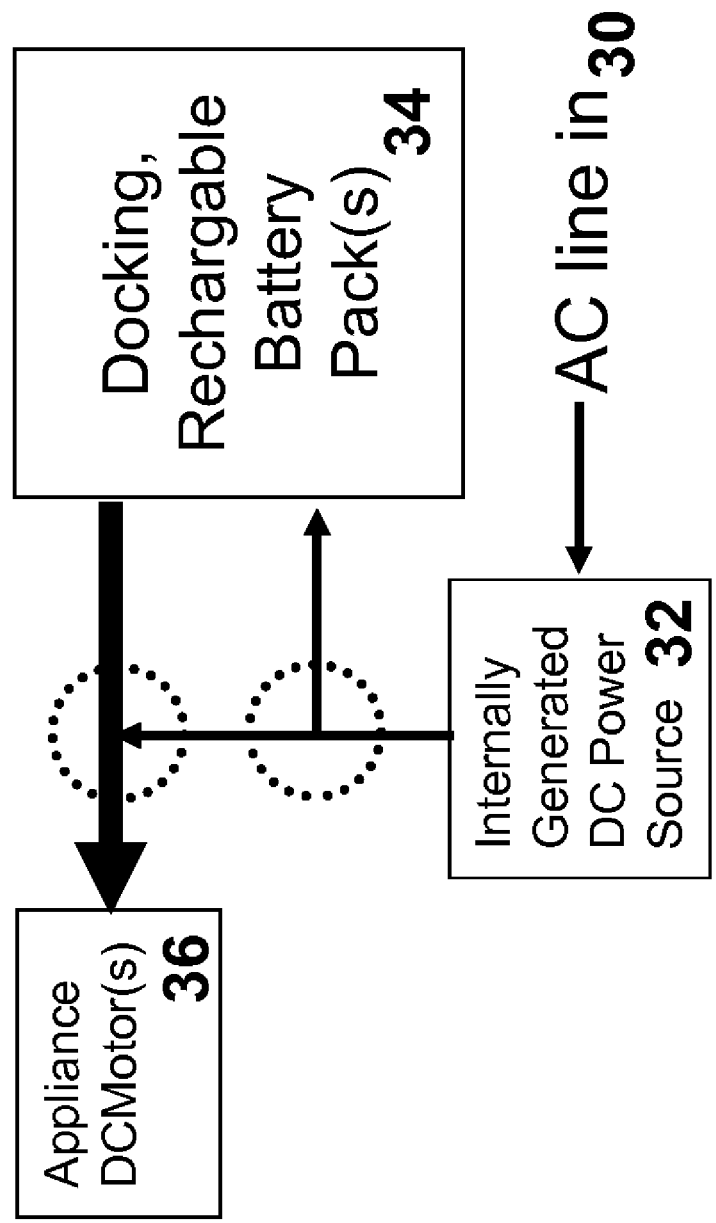

A – Battery/Internal DC Supply Switching Control

B – Battery DC Recharging Control

C – Battery fed internal AC Supply Switching Control

*DC and AC Motors, Battery Back Up Mode Power Flow*

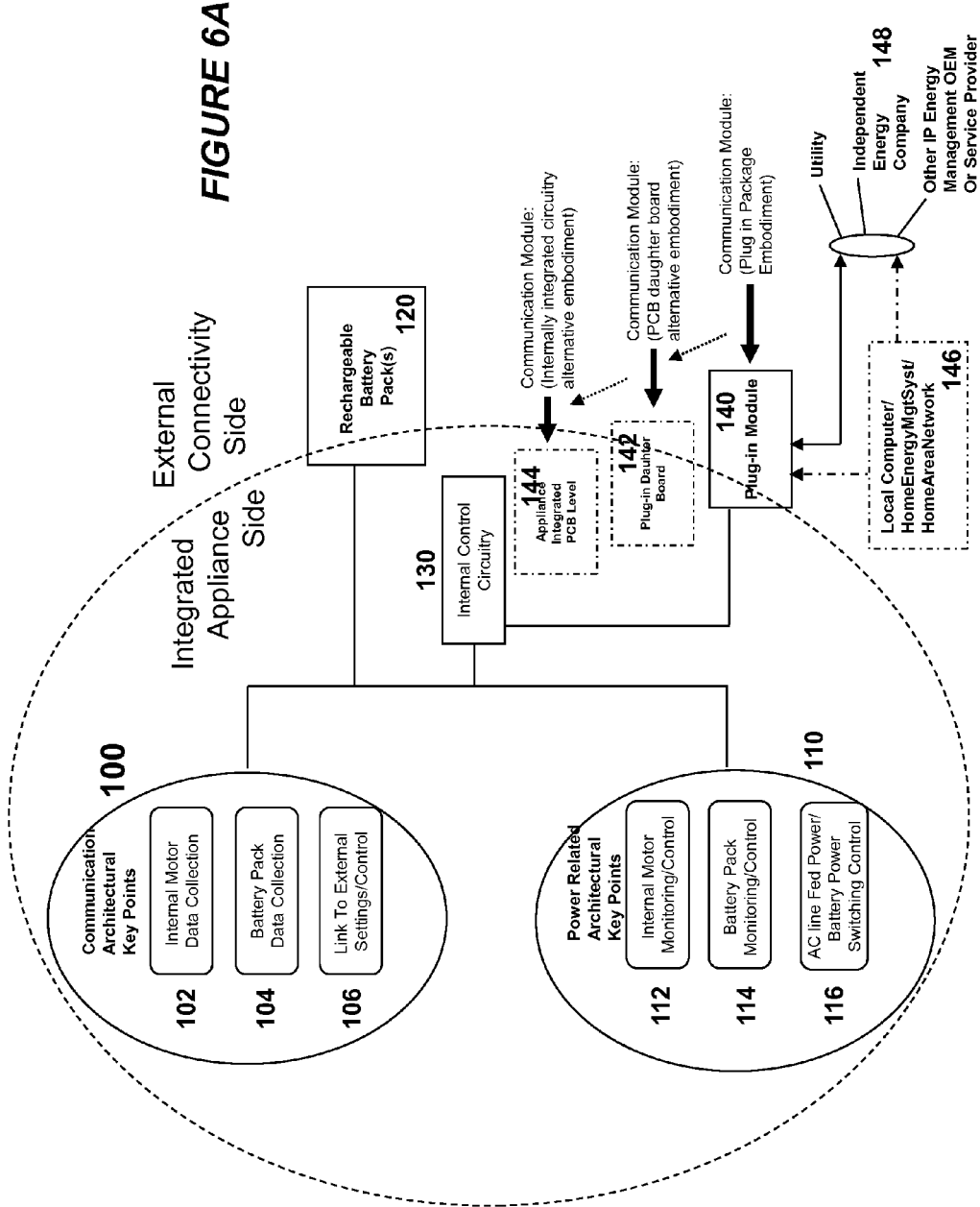

BATTERY ENHANCED, SMART GRID ADD-ON FOR APPLIANCE

BACKGROUND

Major electric appliances traditionally have been powered almost exclusively by alternating current (AC) inputs from a utility provider (for North America residential this being standard wall plug 120V and 240V AC lines).

Recently and independently, interest in "smart appliances" has paralleled the growing interest in the concept of a "smart grid", in which communications and data about various elements of a power grid can be used to better monitor and in some cases modulate the power usage.

For recent smart appliance efforts, a major residential appliance such as a refrigerator, washer or dryer, water heater or possibly other appliance may incorporate more efficient operation, as well as some level of 1-way or 2-way signaling or communication, allowing the user and/or the utility electricity provider to view or measure power consumption and other data related to the appliance operation, and in some cases communicate back to the appliance to modulate its power usage during identified periods where reducing the load on a utility or other electricity grid is deemed beneficial. This ability to signal an electricity-consuming device to lower (or delay) its current power consumption is referred to often as "Demand Response" (DR). DR time is identified generally as either times of peak rates, when reducing or delaying loads has a monetary benefit for the consumer, or as times of peak utility loads, when reducing or delaying loads lessens the burden on the grid and therefore has direct and indirect benefits for the power provider.

One known problem in successfully utilizing these schemes in relation to residential devices is that consumers may choose to opt out of actions which compromise the operation of their lifestyle products, such as allowing a refrigerator to delay defrost cycles or increase temperature, or delaying washing or drying cycles. Thus challenges exist in predicting the amount of energy conserved by a large scale implementation of DR technologies.

Another problem is in achieving the maximum desired impact on temporary energy savings from conventional appliances. Even smart appliances (devices achieved by adding communication and increasing efficiency) only "reduce" the power consumption but do not "eliminate" power consumption on the grid during DR periods. These devices are also dependent on the consumers' willingness to compromise the full operation of the appliance and the individual consumer's usage habits. In this case, ambient household temperature, refrigerator duty cycle and food content, and specific usage cycles of washing machines, hot water applications such as showers and baths, are all difficult to accurately predict, and thus even smart appliances face a further issue of variable and difficulty in quantify energy savings. Thus, conventional DR systems face an inherent limitation on the state of energy use and degree of energy savings which may be predictably achieved.

Another aspect of this same "smart home"/"smart grid" evolving vision involves energy storage. To date, energy storage with regards to home use has been almost entirely limited to mobile devices (remote controls, small vacuum cleaners, power tools, and even small televisions among others). Peripherally, a category of back-up power supplies commonly referred to as Uninterruptable Power Supplies (UPS) has existed for providing back-up AC power (when an inverter is included to generate AC voltages), and more recently models of generalized energy storage including Community Energy Storage (for example metal housings the size of a small car secured within a neighborhood holding 1-100 KWH class storage devices such as batteries), or even residential level general purpose energy storage solutions (for example server rack style cases populated with high-capacity storage devices such as batteries). In each case, the costs of efficient, high-energy density battery technologies has proven an obstacle to large scale adoption, and perhaps just as much a problem is the market challenges of implementing battery-centric solutions which require even larger up-front costs as well as require new sales channels and value propositions to justify this new large apparatus being purchased for its own merits. The benefits in each case might make intellectual sense, but the method of implementing these storage solutions to date has proven limited, particularly at a residential level.

SUMMARY

In one aspect, an apparatus to provide demand response (DR) control of an appliance having a power load, including a rechargeable battery connected to the appliance, the connection including: a communication module to receive DR communications from an external source; a rechargeable battery inserted into a dock or other connection device on the appliance; and a switch coupled to AC line power and the rechargeable battery input power. The apparatus also has a controller coupled to the switch and the communication module, the controller connecting line power to the appliance power load during a first DR period and connecting the rechargeable battery to the power load during a second DR period.

In another aspect, a method for satisfying a demand response (DR) signal includes receiving the DR signal from an external source through a communication module; connecting an energy storage source to an appliance; charging the energy storage source during a first DR period specified by the external source; and disconnecting line power and using power from the energy storage source during a second DR period.

In yet another aspect, an appliance includes a communication module to receive a demand response (DR) signal from an external source; a back-up energy source coupled to an appliance and to the communication module, wherein the back-up energy is charged during a first DR period specified by an external source and discharged during a second DR period specified by the external source; and a switch to disconnect line power during the second DR period.

Implementations of the above aspect may include one or more of the following. The power load can be an alternating current (AC) motor, a direct current (DC) motor, an AC heater, or a DC heater, or other loads such as internal lights, user displays or other peripherals. The communication module communicates over an external wired path or a wireless path. An AC/DC converter can be connected to the line power and to the rechargeable battery. An inverter can be connected to the rechargeable battery to generate AC power for an AC power load. The rechargeable battery output can be supplied directly to a DC power load. An inverter can be connected to the rechargeable battery to drive an AC power load. The line power can be provided to an AC power load and a DC converter to recharge the rechargeable battery during the first DR period. The rechargeable battery output can be provided to the inverter during the second DR period to reduce line power consumption. A bi-directional DC/AC inverter can be connected to an appliance AC power load and an appliance DC power load. More than one independent battery packages may be included to allow variable battery capacities. The communication module may consist of separate plug-in packaged electronics, a plug-in circuit board, or circuitry integrated in proximity with or on the switching/communication controller embodied in the invention.

BRIEF DESCRIPTION OF THE DRAWINGS

FIGS. 3A-3E show various exemplary power flows for an appliance with a power load such as a motor and the dock with rechargeable battery pack.

FIGS. 6A-6B show exemplary electrical architectures for supporting DR in an appliance.

DETAILED DESCRIPTION OF THE PREFERRED EMBODIMENT

The systems described below enable appliances such as, but not limited to, refrigerators, clothes washers, clothes dryers, hot water heaters and air conditioners, to be intelligently switched from standard AC line power to local battery power (and vice versa), combined with the enablement of external, internet connected control of the switching function, to allow utility smart meters infrastructure through the Internet Protocol (IP) solutions or local software based energy management solutions to predictably and intelligently reduce or eliminate the draw of AC line power by the appliance, delivering a significant enhancement to DR for the smart grid.

Figure 1:
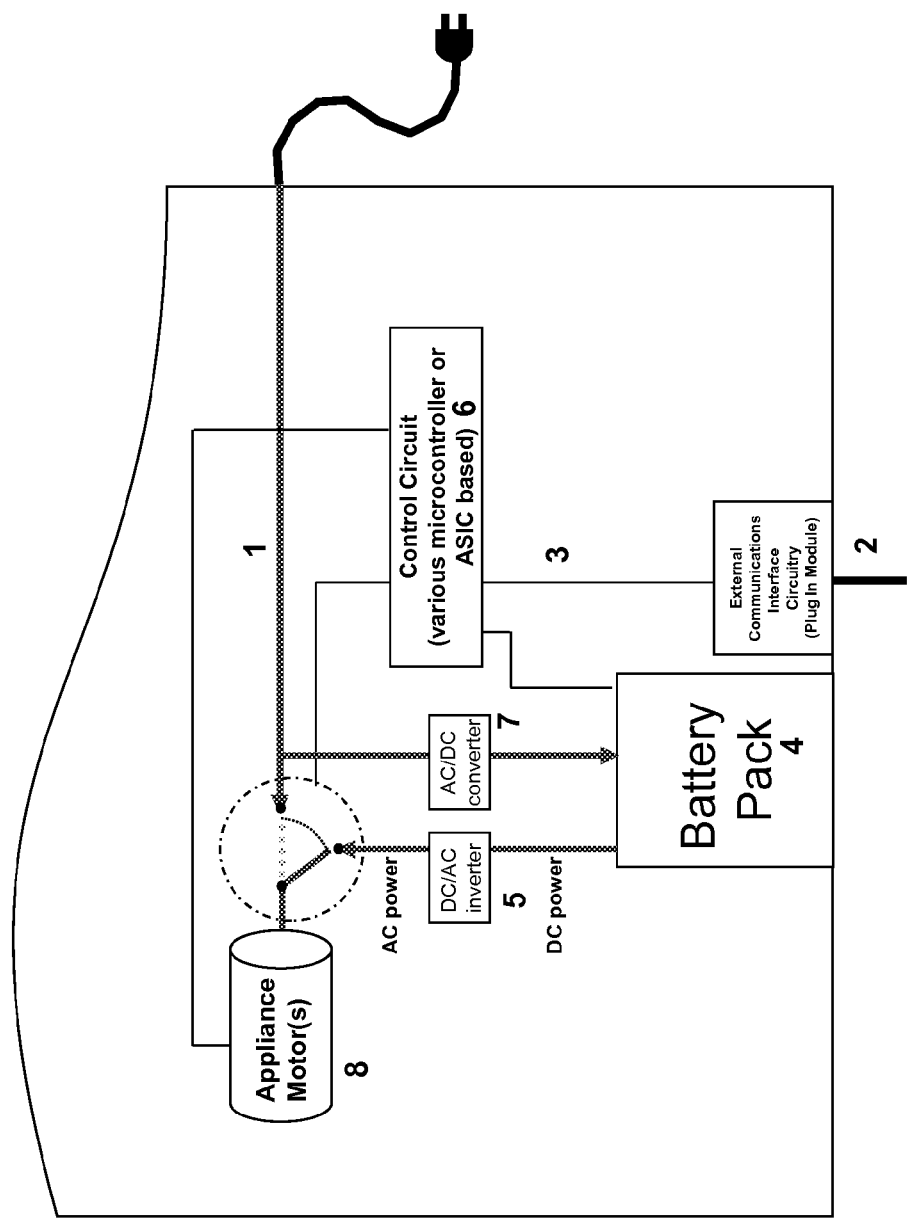
FIG. 1 shows an exemplary system supporting DR for an appliance.

FIG. 1 shows an exemplary system supporting DR for an appliance. A power line 1 provides AC power supplied by the utility to the appliance. A network link 2 supports communication between the appliance and the utility over a network such as the Internet, for example. The network link 2 is connected to a control circuit 6 over an internal bi-directional signal path 3. The control circuit 6 can also receive data from other alternate network links. The control circuit in turn controls a battery pack 4 to discharge power through a DC/AC inverter 5 that powers the appliance's motor 8. The battery can also be charged through an AC/DC converter 7 which in turn is powered by the power line 1. The control circuit 6 can also receive feedback data from the motor 8 such as motor status and power consumption, among others.

Figure 2:
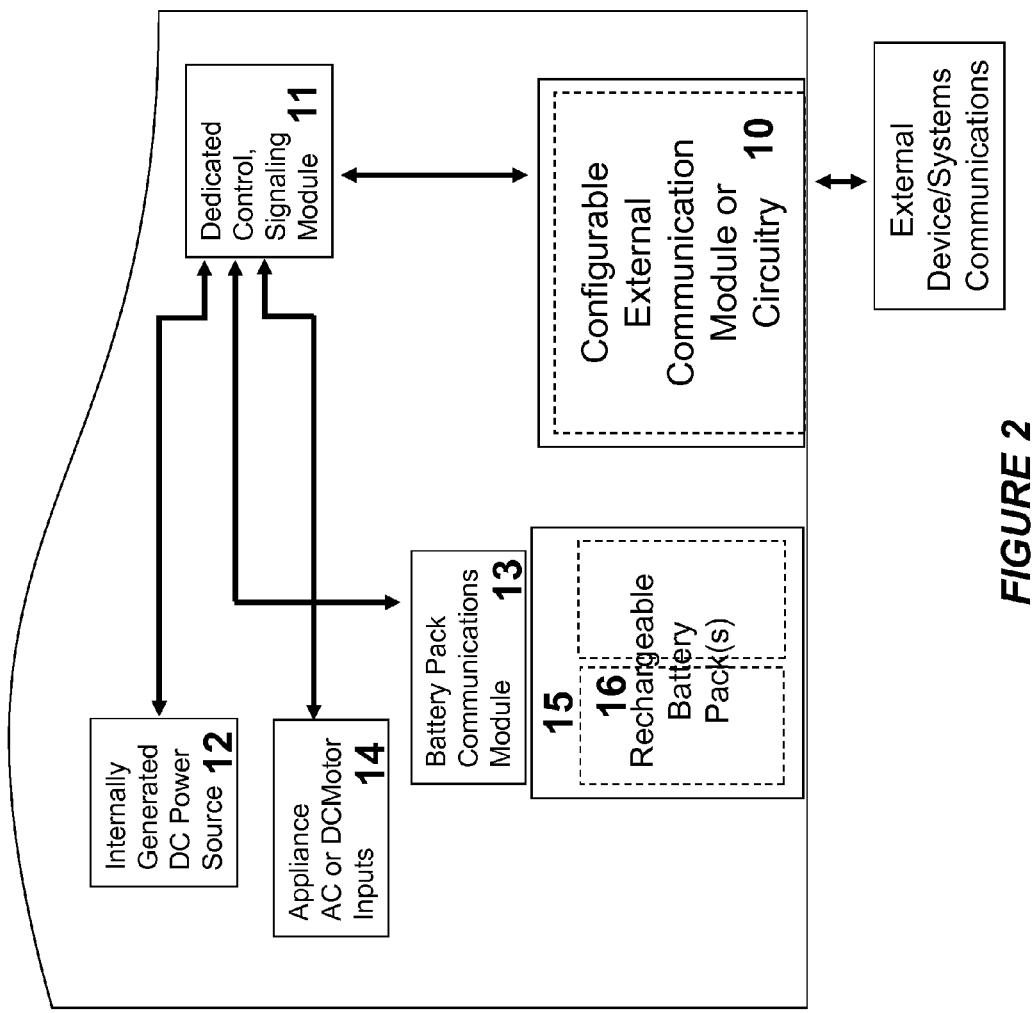
FIG. 2 shows another exemplary view of a system that allows appliances to have DR capability.

FIG. 2 shows another exemplary view of a system that allows appliances to have DR capability. In FIG. 2, a configurable external communication module or circuitry 10 receives data communications from an external device or system. The configurable external communication module or circuitry 10 in turn communicates with a dedicated control and signaling module 11, which in turn controls an internally generated DC power source 12, an appliance AC or DC motor 14, and a battery pack communication module 13. The battery pack communication module 13 is connected to a dock 15 that receives one or more rechargeable battery packs 16.

Figure 3A:
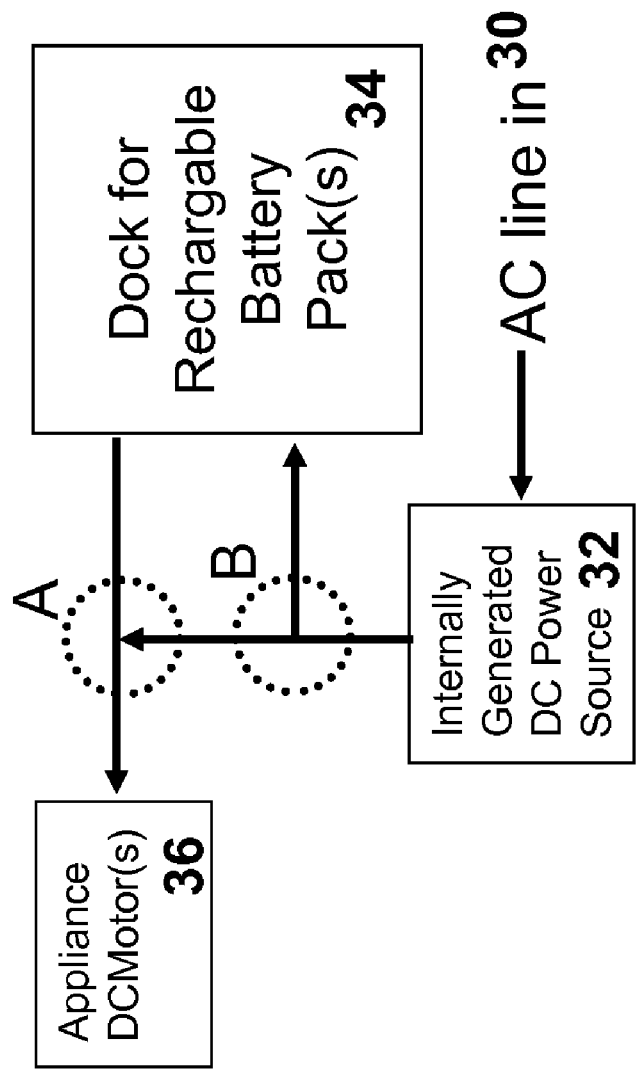

FIG. 3A shows an exemplary appliance embodiment of the primary switching architecture for an appliance with a power load consisting of only a DC motor and the dock with rechargeable battery pack, and FIGS. 3B-3E show various exemplary power flow scenarios for the same exemplary appliance. Although the motor is used in the example, it is to be understood that the power load can be any other power consuming electrical devices such as a heater or a cooler, among others.

In FIG. 3A, an AC line input 30 is connected to a single, multi-function internal DC power source 32, which in turn powers an appliance motor 36 through a battery/internal DC supply switching control A. The internal DC power source 32 also powers a dock 34 with rechargeable batteries therein through a battery DC recharging control B. In FIG. 3A, power from the AC line 30 is used to power the appliance without charging the dock 34. In contrast, in FIG. 3D, power from the AC line 30 is used to power the appliance and to recharge batteries in the dock 34.

FIG. 3B shows an exemplary flow where the AC line 30 directly powers the appliance motor 36. The energy flows through the internally generated DC power source 32 to provide power to the appliance motor 36. In this example, the internally generated DC power source 32 is not needed because AC power is available outside of the DR period.

FIG. 3C shows an exemplary flow using battery back-up power. In this mode, the AC line input 30 is not used pursuant to a DR shed power command, and energy from the rechargeable battery packs in the dock 34 is provided to the appliance's power load such as the motor 36.

Figure 3D:
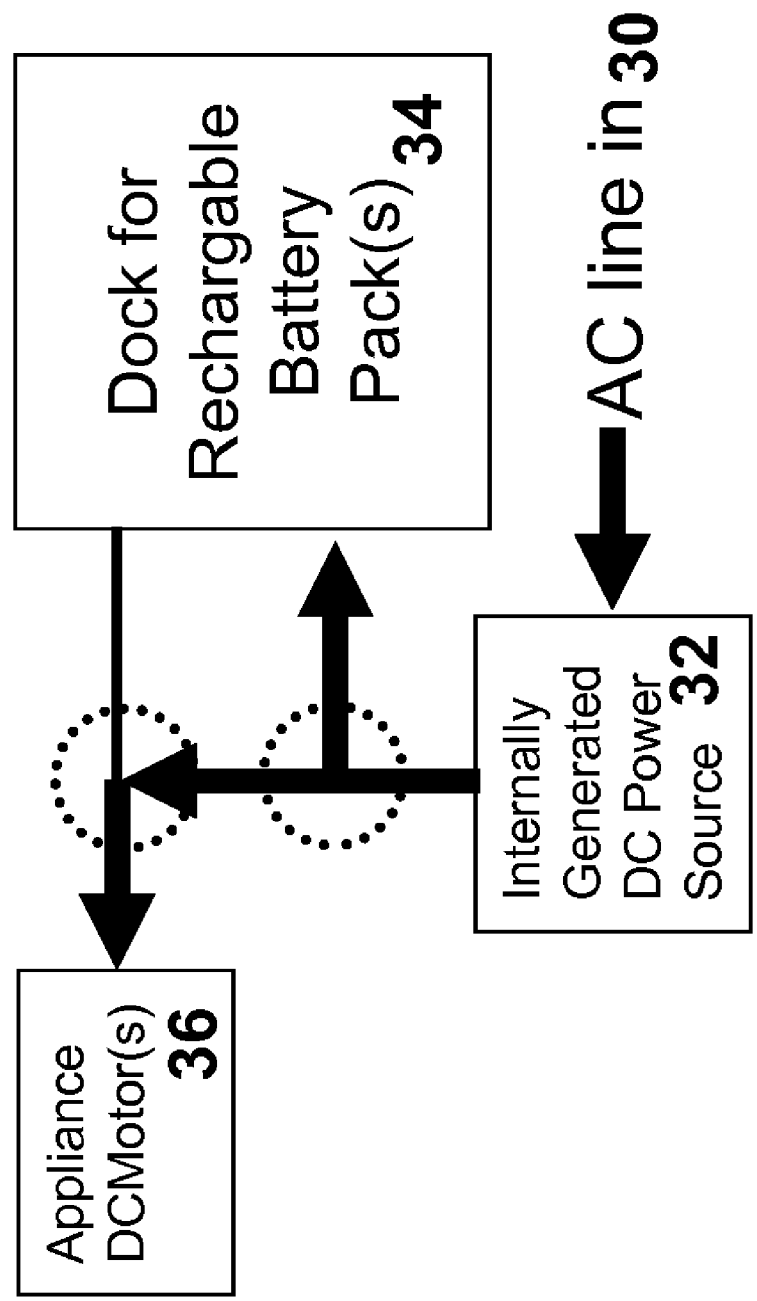

FIG. 3D shows an exemplary flow where AC line in power 30 is used both to power the appliance motor and to recharge the battery pack during a non-DR time period, for example during night hours when rates are low or other desired times.

Figure 3E:
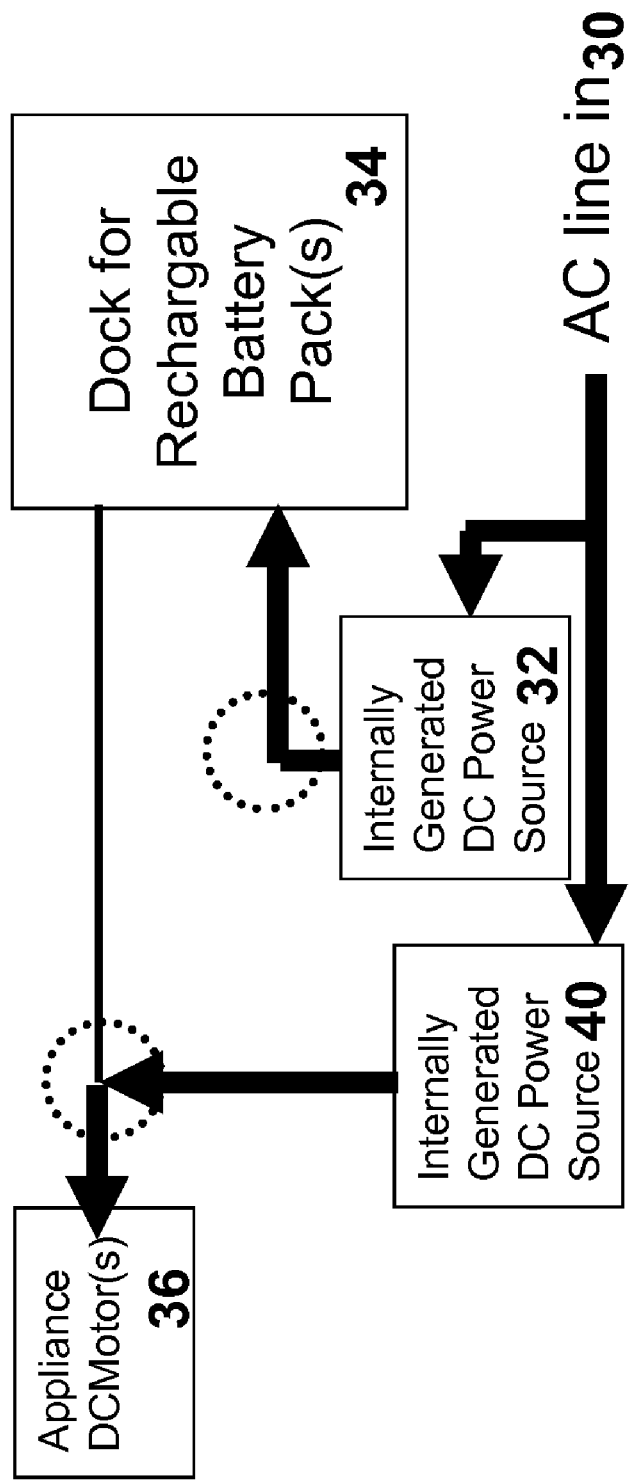

FIG. 3E shows an exemplary flow where separate DC power sources are used in combination with the AC line 30 to supply power to the appliance and to recharge the batteries. In this embodiment, the AC line 30 supplies power to a plurality of internally generated DC power sources 32 and 40. The DC power source 32 provides power to the dock 34 to recharge the battery packs. The DC power source 40 provides power to the appliance motor 36.

Figure 4A:
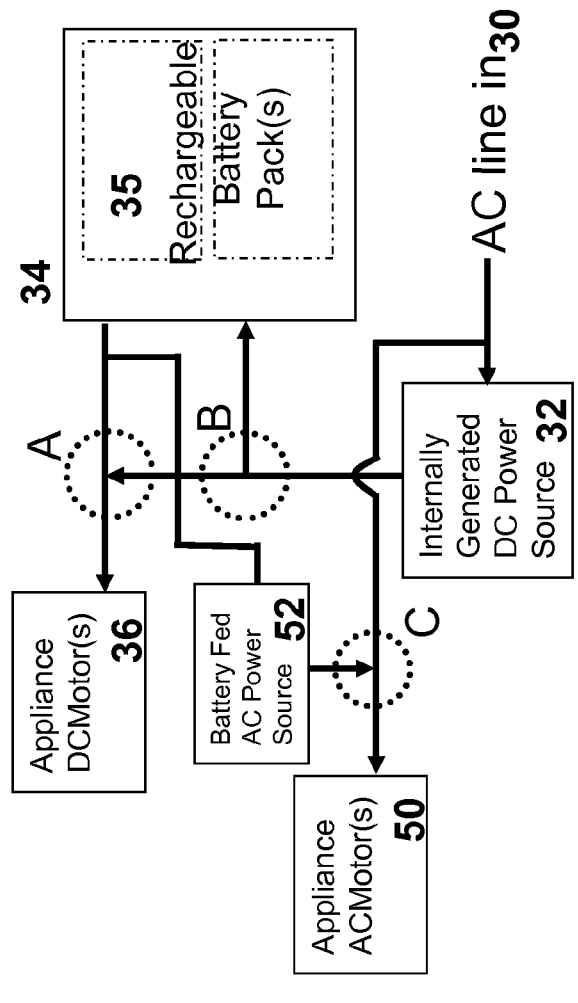
FIGS. 4A-4D show exemplary AC/DC load connectivity for an appliance.
Figure 4B:
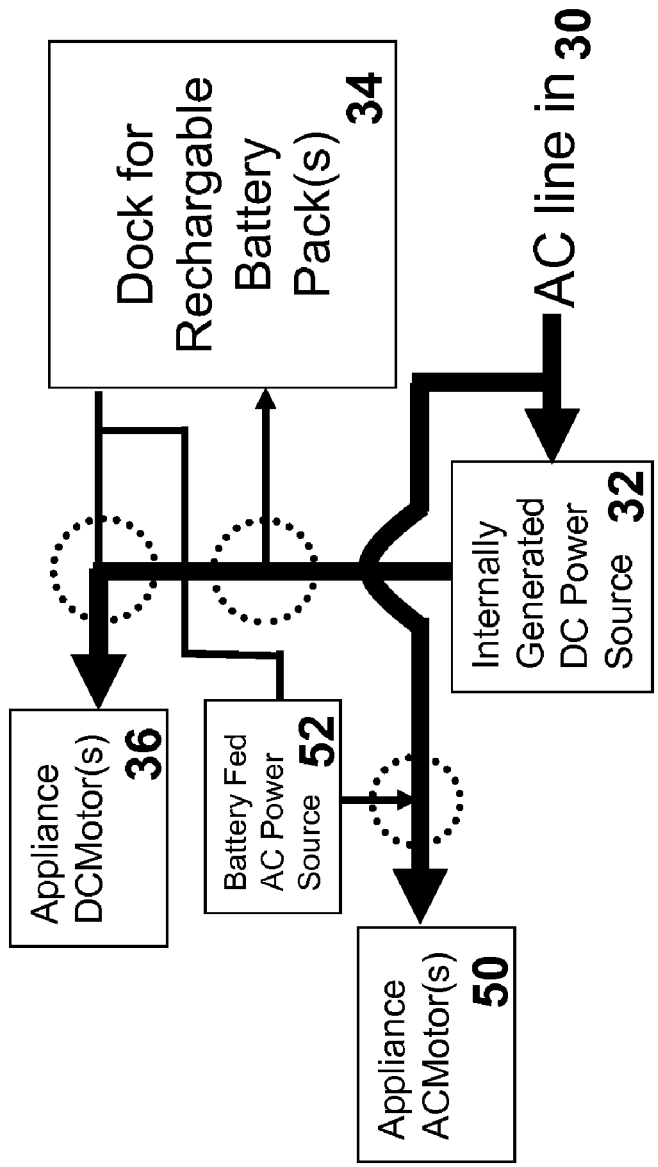
Figure 4C:
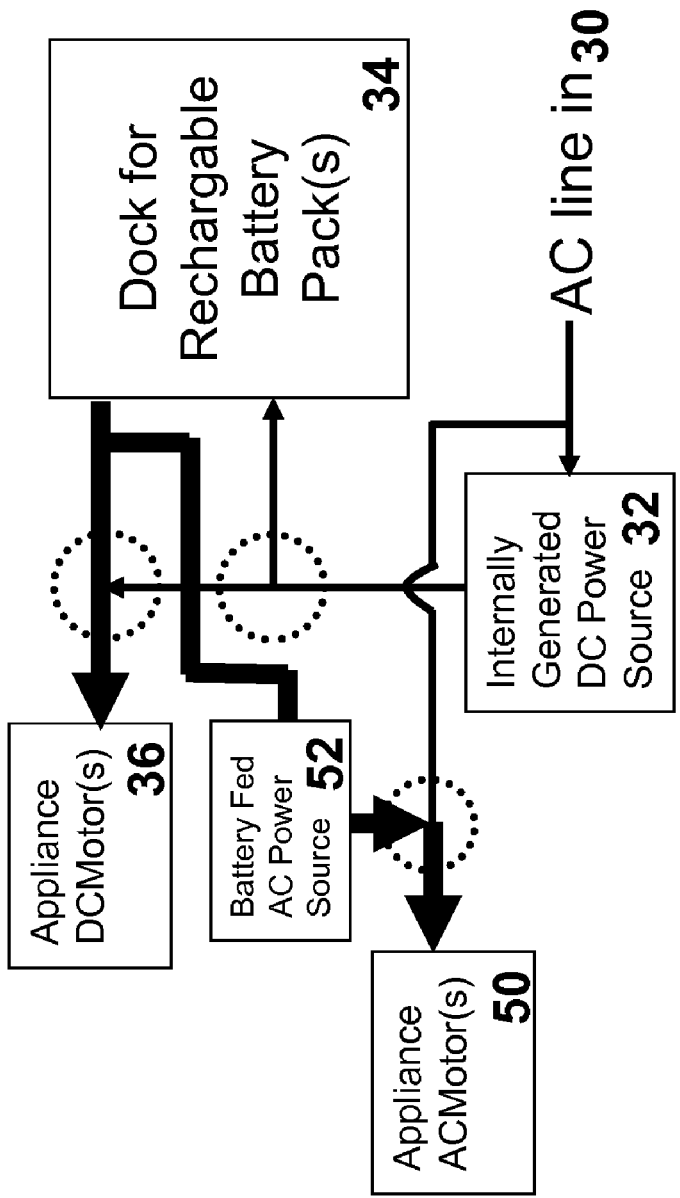
Figure 4D:
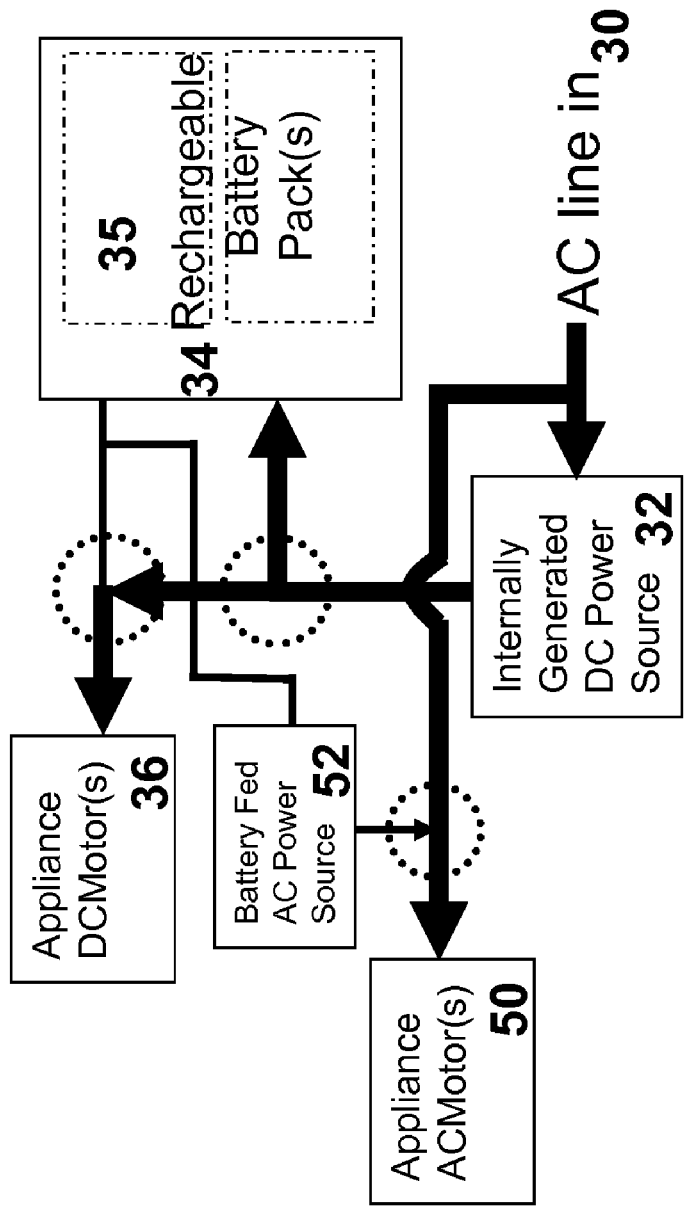

FIG. 4A shows an exemplary appliance embodiment of the primary switching architecture for an appliance with a power load consisting of both a DC motor and and AC motor and the dock with rechargeable battery pack, and FIGS. 4B-4D show various exemplary power flows scenarios for the same exemplary appliance.

In FIG. 4A, the internally generated DC power source 32 receives power from AC line 30 and in turn may provide power to the appliance DC motor 36 as well as to the dock 34 to recharge the rechargeable battery pack 35. The dock 34 may provide power to a battery fed AC power source 52, whose output is combined at a switching control C with the AC line 30 to appliance AC motor 50.

FIG. 4B shows an exemplary power flow in typical AC line fed power mode (typically when no DR signal is requesting a decrease in power consumption) Power from the AC line is used to power the appliance AC motor 50 and to power the internally generated DC power source 32, which in turn powers the appliance AC motor 50.

FIG. 4C shows an exemplary flow where power from the rechargeable battery packs in the dock 34 is used to power the appliance DC motor 36 and the battery fed AC power source 52 which in turns power the appliance AC motor 50, typically when a DR signal is requesting a decrease in power consumption).

FIG. 4D shows an exemplary power flow in typical AC line fed power mode in which the internally generated DC power source 32 is also recharging the batteries 35. Turning now to FIGS. 5A-5D, an exemplary system with a bi-directional inverter is shown. In this embodiment, an inverter capable of translating DC input to AC output, and conversely AC input to DC output, may be utilized to simplify the embodiment.

Figure 5A:
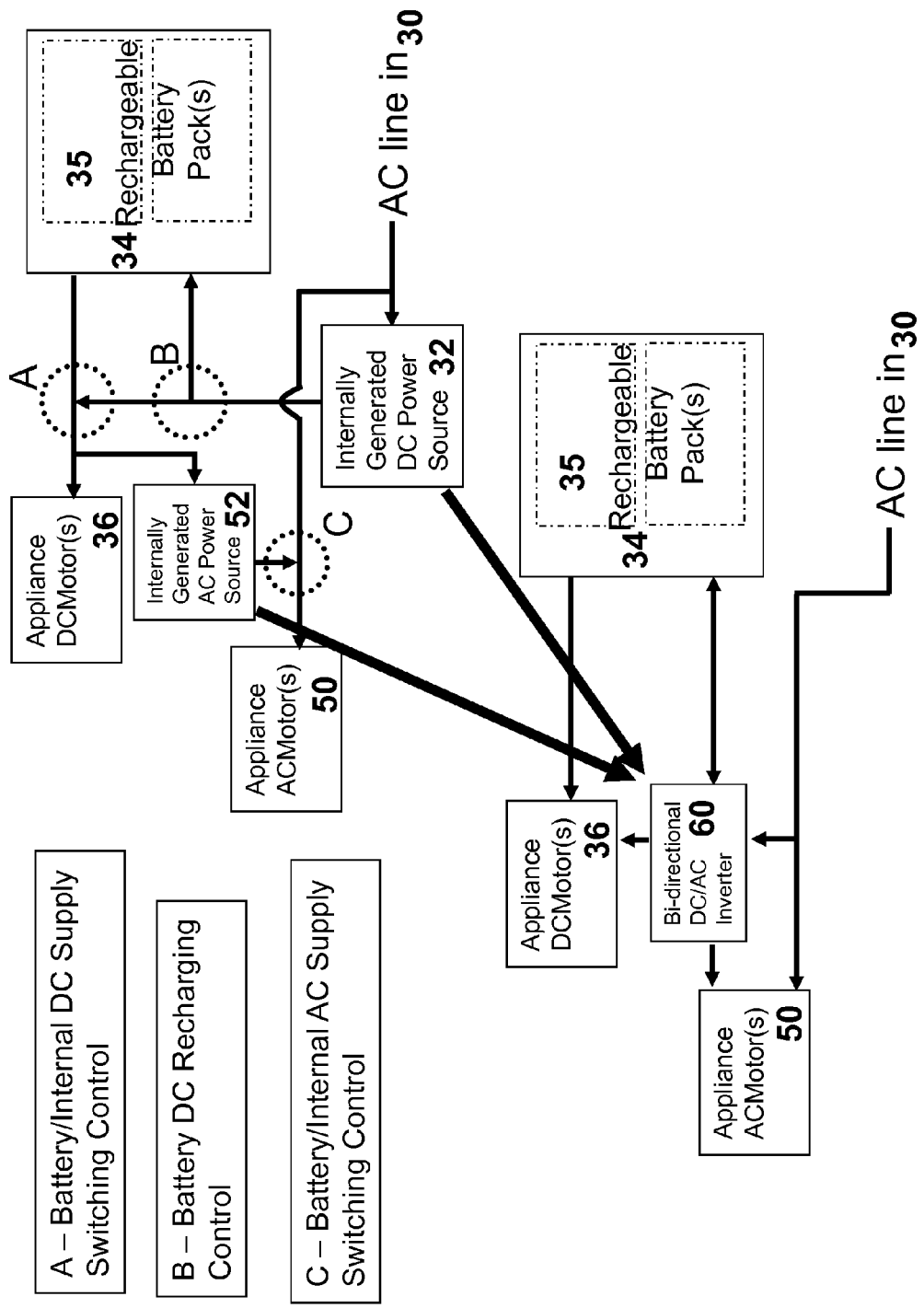
FIGS. 5A-5D show another exemplary system with a bi-directional inverter.

In FIG. 5A, the internally generated DC power source 32 and internally generated AC power source 52 are combined into a bi-directional DC/AC inverter 60. The bidirectional DC/AC inverter 60 receives power from AC line 30 and supplies DC power to the dock 34 or alternatively or in combination to the appliance DC motor 36. In addition, the bidirectional DC/AC inverter 60 may receive DC power from the rechargeable batteries 35 and supply AC power to the appliance AC motor 50.

Figure 5B:
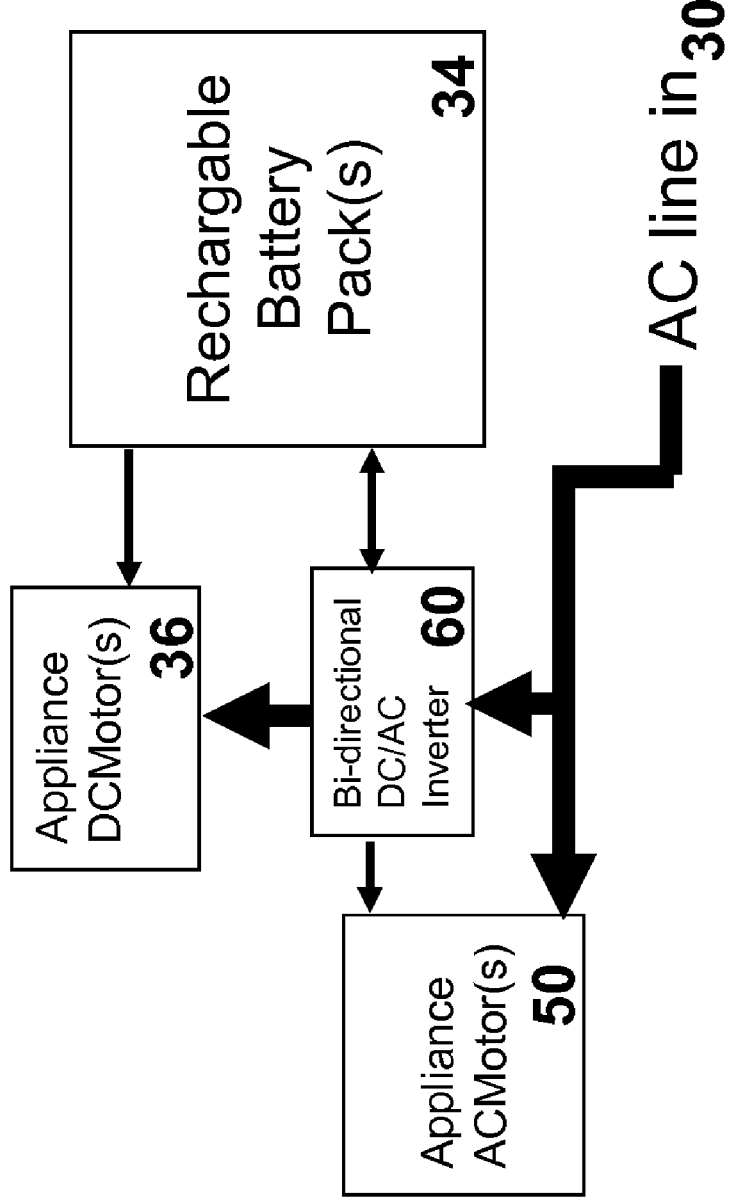

FIG. 5B shows an exemplary power flow where the AC line power is supplied to the inverter 60 and the AC motor 50. The inverter 60 in turn generates DC power for the appliance DC motor 36.

Figure 5C:
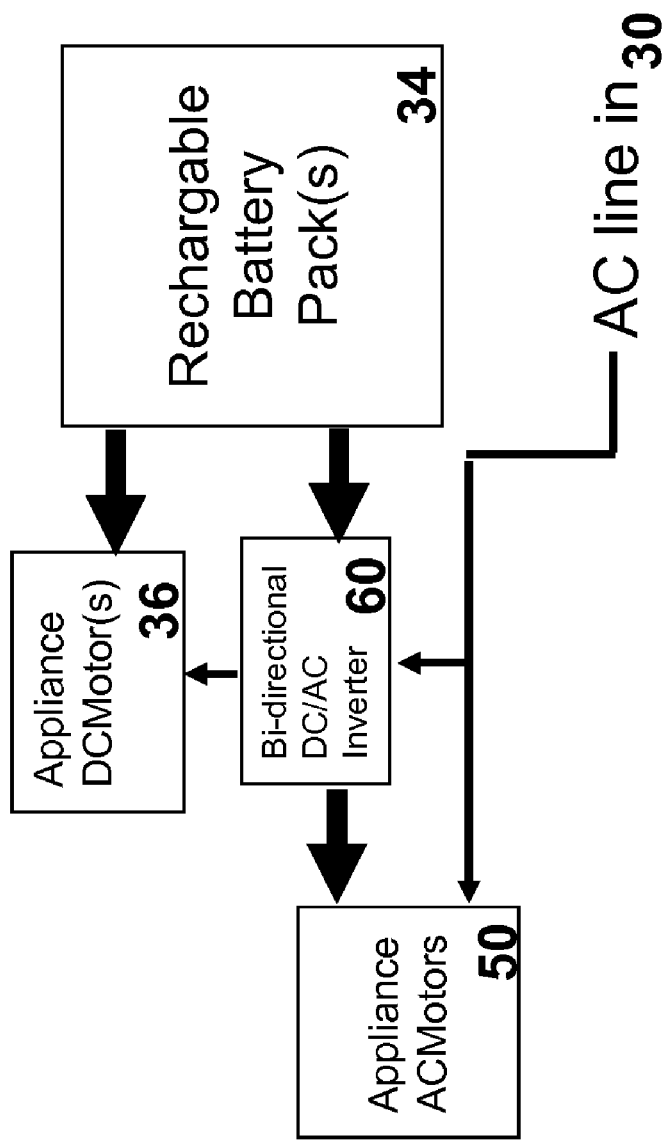

FIG. 5C shows an exemplary power flow using battery power from the dock 34. In this example, power is provided to the appliance DC motor 36 and the bi-directional DC/AC inverter 60, which supplies AC power to the appliance AC motor 50.

Figure 5D:
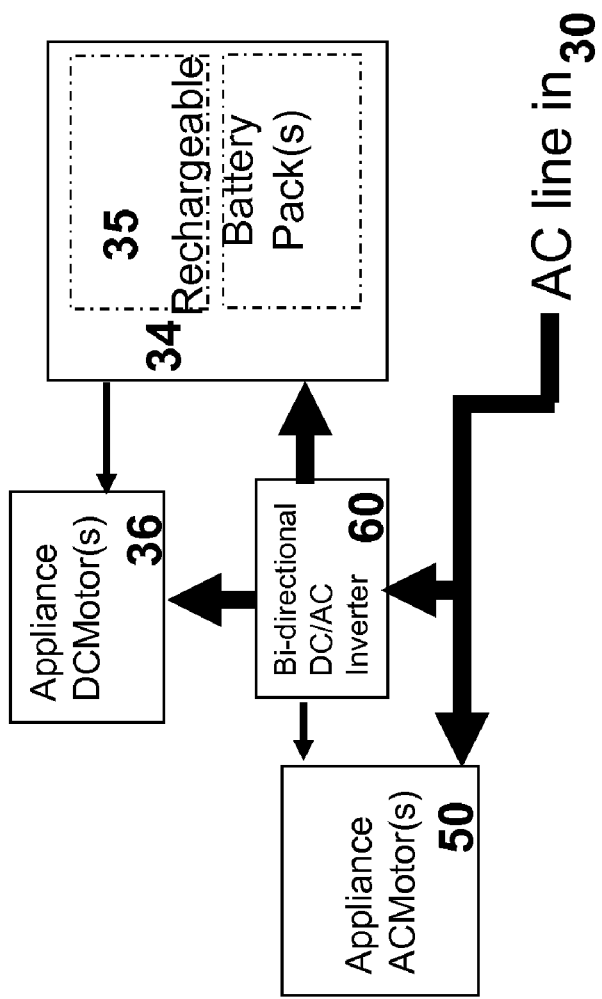

FIG. 5D shows an exemplary charging power flow in which AC line power is provided to the appliance AC motor 50 and to the DC/AC inverter 60, which in turn provides DC power to the appliance DC motor 36 and the dock 34 to recharge the battery packs in the dock 34.

Figure 6B:
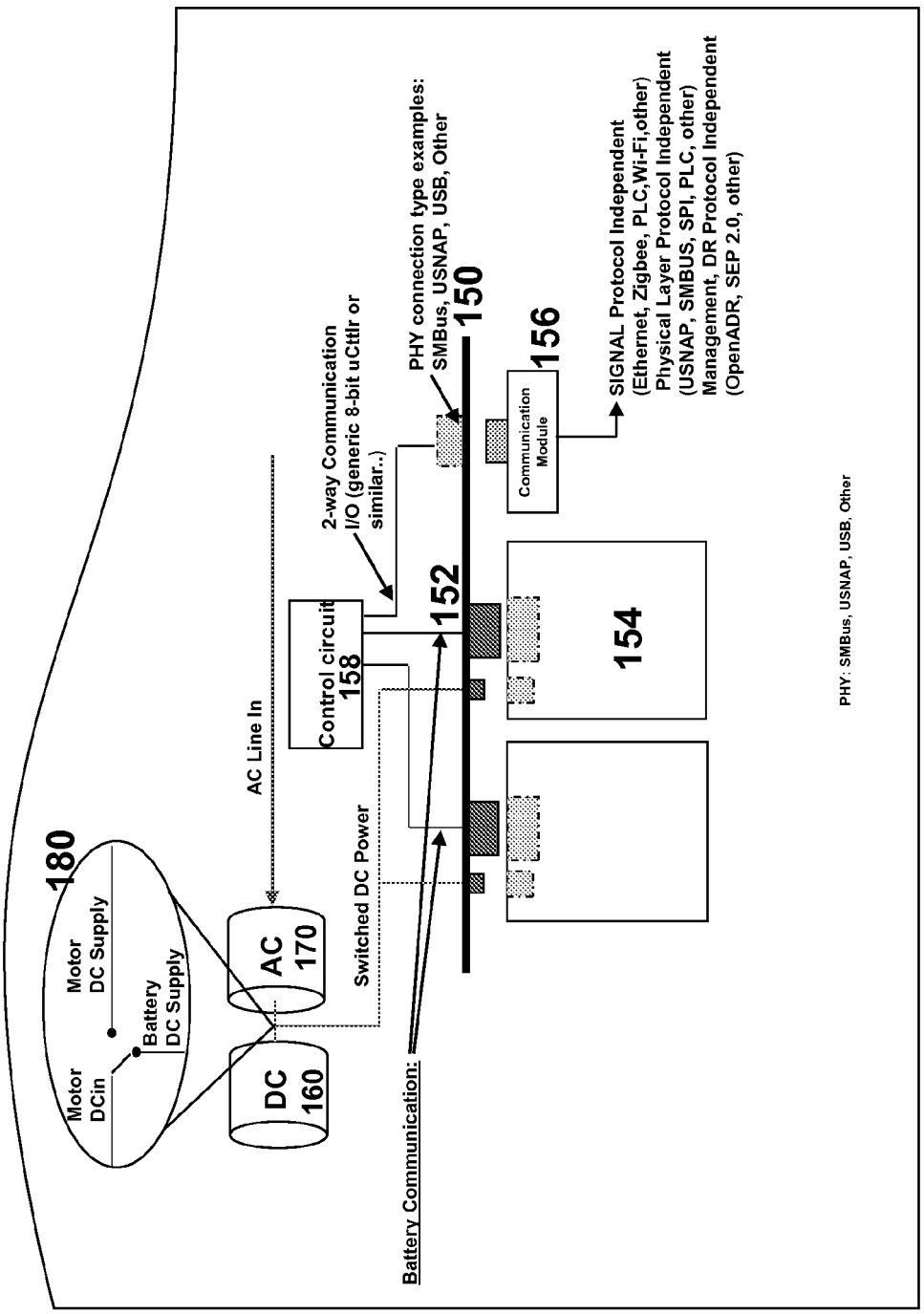

FIGS. 6A-6B show exemplary electrical architectures for supporting DR in an appliance. FIG. 6A shows an integrated architecture for internal and external power and communication operations. A communication architecture 100 includes an internal motor data collection module 102, a battery pack data collection module 104, and a link to external settings or controls 106. A power architecture 110 includes an internal motor monitoring/control module 112, a battery pack monitoring/control module 114, and an AC line fed power/battery power switch control module 116. Both power and communication architectures are embodied within the appliance, and are both linked to an internal control circuitry 130. The internal control circuitry 130 manages in turn the battery back-up module 120, and is linked to a communication module which is shown embodied alternatively as a plug-in electronic package 140, a plug-in PCB daughter board 142, or an internally integrated circuitry 144. The communication module receive DR data and other energy management communications from an external source such as a utility, an independent energy company, or a third party IP energy management OEM or service provider, 148.

Alternatively, a local Computer, Home Energy Management System or Home Area Network 146 may serve as an interface to the external signal or communication path.

The input to the plug-in module(s) can be a protocol independent signal such as Ethernet, Zigbee, PLC, Wi-Fi, among others. The system is physical layer protocol independent and can use USNAP, SMBUS, SPI, PLC, among others. The system is also DR protocol independent and can use OpenADR, SEP, among others.

Turning now to FIG. 6B, an exemplary electrical architecture is shown. In this embodiment, the dock includes a bus 150 that carries battery communication and power signals as well as command/control signals from the external source. One or more smart battery packs 154 communicate over the bus 150 when the battery pack 154 is inserted into the dock or other connection device. A communication module 156 can transfer command/control data to/from the external source when it is plugged into the bus 150. Data from the battery pack 154 and the communication board 156 is processed by a controller 158. The communication can be a two-way communication input/output (I/O) signal, among others. The controller 158 causes switched DC power to be provided to a DC load 160, while AC line input can be provided to an AC load 170. A switch 180 is controlled by the controller 158 and power can be selectively switched between battery power and AC power by the controller 158.

Figure 7:
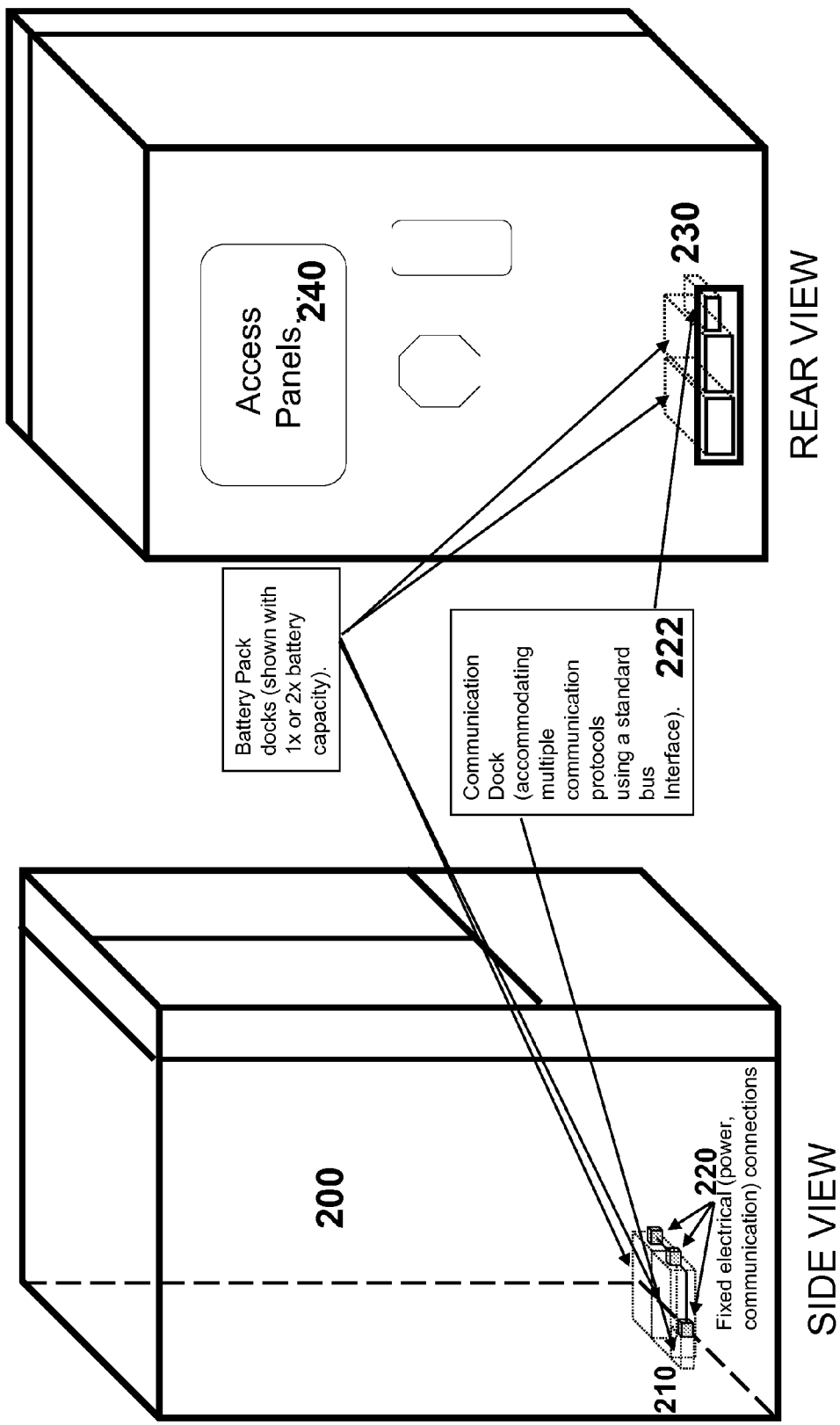
FIG. 7 shows an exemplary refrigerator with the DR system of FIG. 1.

An example implementation of a refrigerator with the DR system of FIG. 1 is shown in FIG. 7. In this example, a residential, full-size refrigerator 200 is modified to include one (or multiple parallel) "battery packs" 210 (defined here as simply a combination of battery cells packaged as a single cartridge or package with a single set of connectors). The battery pack(s) 210 are shown here inserted into an integrated dock, or port, 230 designed into the appliance, and internally connected to the appliance power supply lines through a high power switch such as a high voltage mechanical relay, or solid state relay with isolation and with 5V or other logic level in put control capability, or any other suitable electrical switching element. The dock also includes electrical connections 220 such as power and data communication lines. In addition, a communication dock 222 is provided to receive plug-in cards that accommodate various communication protocols over a standard bus interface. For maintenance purposes, one or more access panels 240 are available on the refrigerator. The high power switch enables toggling between powering the appliance by standard AC line in (wall plug) and on-board battery packs, and may be designed to allow only switching entirely from one to the other, or may be designed to allow intermediate states of operation where some power is drawn from the wall plug and some power is drawn from the battery pack(s).

An on-board control circuit is embodied as part of the embodiment of FIG. 7 to tie the switching of the battery and AC line operation described above to an externally connected communication or signal path, to allow external signal management of this switching function. In one embodiment, the control circuit performs:

controlling of the integrated or attached battery pack recharging mechanism monitoring/communication with the integrated or attached battery pack power management or other battery pack circuitry.

monitoring of the appliance motor operation, power consumption.

controlling of switching from AC line in operation to battery pack operation, in entirety or in part.

controlling of handshaking or communication with an integrated signal path in a manner allowing and enabling external signals to be utilized intelligently to manage the switching of AC line in power vs. battery power operation.

The "on-board control circuit" element by design does not specify a specific external communication protocol, and may be embodied by fully integrating any desired wireless or wired protocol as part of the appliance design itself, or may be embodied by integrating a communication "port" or "dock" which specifies and can embody correspondingly designed communication "daughter boards", "modules", or other embodiments of various external signaling solutions, but in all cases will include the integrated "on-board control circuit" described herein, allowing and enabling any compliant external communication link to interface and effectively manage the primary AC line/battery switching function.

The dock on a major home appliance accommodates one or more high energy density rechargeable battery pack(s), operating in conjunction with communication circuitry. The dock allows external control or signaling (the most basic function being switching from AC line in power to on-board battery pack operation), and allows "seamless DR" and ultimate intermittent power reduction (essentially to zero AC power) on an as-needed basis up to the battery storage capacity.

Figure 8B:
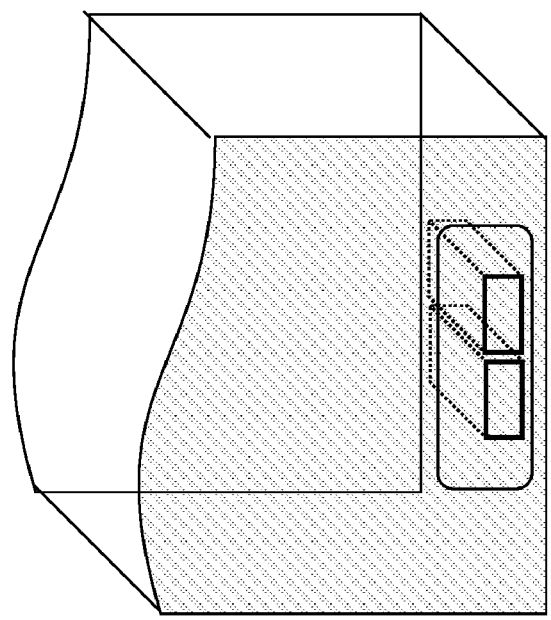
FIGS. 8A-C show exemplary mechanical architectures for connecting the battery or energy storage device to the appliance.
Figure 8A:
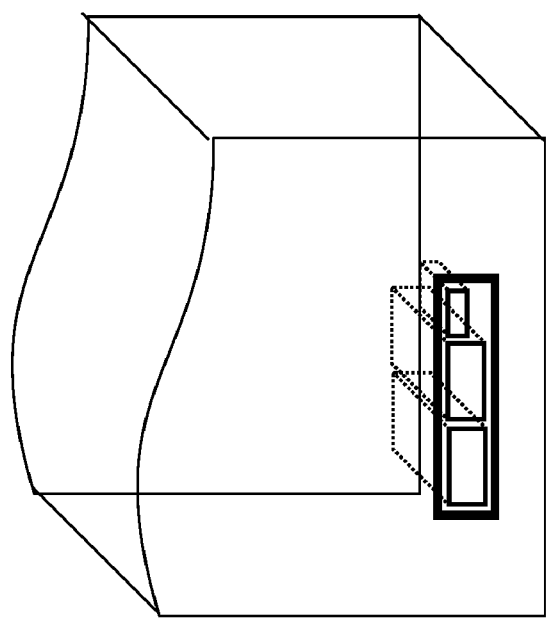
Figure 8C:
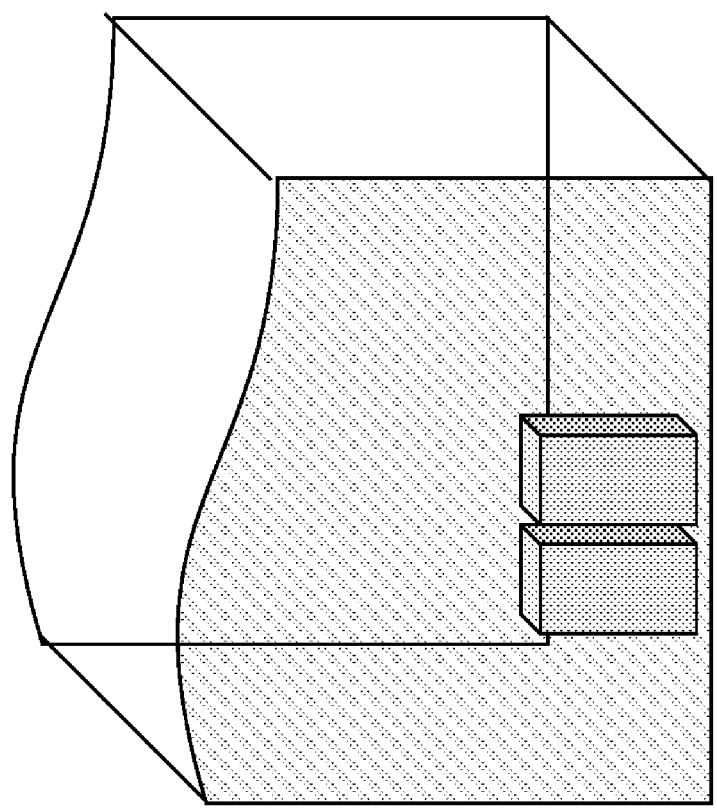

FIGS. 8A-8C show exemplary embodiments with alternative rechargeable battery connection methods.

FIG. 8A shows an exemplary embodiment with a docking type connection, with the rechargeable battery pack(s) able to be populated during appliance manufacture or at an point after manufacture.

FIG. 8B shows an exemplary embodiment with an external type connection, which may have an advantage of requiring less mechanical modification to an appliance design, again with the rechargeable battery pack(s) able to be populated during appliance manufacture or at an point after manufacture.

FIG. 8C shows an exemplary embodiment with an internally integrated connection, which may have advantages of limiting end-user access to the battery elements, simplifying design, or other advantages.

Advantages of the preferred embodiments may include one or more of the following. The docking battery solution functions as a system with an independent external communication circuit and allows several immediate benefits. For example, the battery dock may be shipped unpopulated to reduce manufacturing cost and provides a flexible added value point which may occur anywhere in the supply chain. The system can link the battery dock to an independent external communication circuit, allowing external signal/control of the battery operation mode as well as many additional appliance communications capabilities. The system supports the ability for Demand Response implementations achieving up to 100% temporary off-loading of appliance AC power draw. Further, up to 100% predictable usage can be achieved, due to no consumer usage impact and therefore no need to accommodate consumer "opt-in" or "opt-out" concerns. The system provides a true path to "Seamless Demand Response." The system further provides the ability to intelligently accommodate instability in any specific geography's AC power grid by providing a method for utilizing a connected rechargeable battery pack(s) for temporary operation predicated by external signaling or electrical monitoring. The system is a cost mitigated flexible solution which allows any external signaling protocol and any future compatible battery pack to be utilized. Hence, instead of trying to define and force feed what the world needs as "the smart grid solution", the invention is a beneficial "smart grid ingredient" which is adoptable and adaptable by any of the supply channel players interested in the advantages the system offers.

What is claimed is:

1. An apparatus to provide demand response (DR) control of an appliance having a power load, comprising:
   a. a rechargeable battery connected to the appliance;
   b. a communication module to receive DR communications from an external source;
   c. a switch coupled to a line power and the rechargeable battery; and
   d. a controller coupled to the switch and the communication module, the controller connecting line power to the power load during a first DR period and connecting the rechargeable battery to the power load during a second DR period.

2. The apparatus of claim 1, wherein the rechargeable battery comprises a plurality of independent packages to allowing a plurality of battery hierarchy to power the appliance.

3. The apparatus of claim 1, wherein the power load comprises one of: an alternating current (AC) motor, a direct current (DC) motor, an AC heater, and a DC heater.

4. The apparatus of claim 1, wherein the communication module communicates over wired path or a wireless path.

5. The apparatus of claim 1, comprising an AC/DC converter coupled to the line power and to the rechargeable battery.

6. The apparatus of claim 1, comprising an inverter coupled to the rechargeable battery to generate AC power for an AC power load.

7. The apparatus of claim 1, wherein the rechargeable battery is supplied directly to a DC power load.

8. The apparatus of claim 1, comprising an inverter coupled to the rechargeable battery to drive an AC power load.

9. The apparatus of claim 1, wherein the line power is provided to an AC power load and a DC converter to recharge the rechargeable battery during the first DR period.

10. The apparatus of claim 1, wherein the rechargeable battery output is provided to an inverter during the second DR period to reduce line power consumption.

11. The apparatus of claim 1, comprising a bi-directional DC/AC inverter coupled to an appliance AC power load and an appliance DC power load.

12. A method for satisfying a demand response (DR) signal, comprising:
   a. receiving the DR signal from an external source through a communication module;
   b. connecting an energy storage source to an appliance;
   c. charging the energy storage source during a first DR period specified by the external source; and
   d. disconnecting line power and using power from the energy storage source during a second DR period.

13. The method of claim 12, comprising inverting battery energy to generate an alternating current (AC) voltage and providing the AC voltage to an AC power load.

14. The method of claim 12, comprising providing bi-directional communications from the appliance to the external source or vice versa to optimize a power grid.

15. The method of claim 12, comprising monitoring and capturing data on the power load, rechargeable battery and receiving control signals from the external source.

16. The method of claim 12, comprising monitoring the power load, the battery pack.

17. The method of claim 12, wherein the power load comprises one of: an alternating current (AC) motor, a direct current (DC) motor, an AC heater, and a DC heater.

18. The method of claim 17, wherein the external source comprises a local software management system within a building.

19. The method of claim 17, wherein the external source comprises a utility or a third party.

20. An appliance, comprising
   a. a power load coupled to the appliance;
   b. communication module to receive a demand response (DR) signal from an external source;
   c. a back-up energy source coupled to the power load and to the communication module and receiving line power, wherein the back-up energy is charged during a first DR period specified by an external source and discharged during a second DR period specified by the external source; and
   d. a switch to disconnect line power during the second DR period.

* * * * *